US008969429B2

(12) United States Patent
Laredo et al.

(10) Patent No.: US 8,969,429 B2
(45) Date of Patent: Mar. 3, 2015

(54) LOW-TACK, HYDROPHOBIC OPHTHALMIC DEVICE MATERIALS

(75) Inventors: Walter R. Laredo, Fort Worth, TX (US); Xuwei Jiang, Arlington, TX (US)

(73) Assignee: Novartis AG, Basel (CH)

( * ) Notice: Subject to any disclaimer, the term of this patent is extended or adjusted under 35 U.S.C. 154(b) by 85 days.

(21) Appl. No.: 13/367,914

(22) Filed: Feb. 7, 2012

(65) Prior Publication Data

US 2012/0202916 A1   Aug. 9, 2012

Related U.S. Application Data

(60) Provisional application No. 61/440,633, filed on Feb. 8, 2011, provisional application No. 61/493,654, filed on Jun. 6, 2011.

(51) Int. Cl.
  *C08L 33/08* (2006.01)
  *G02B 1/04* (2006.01)

(52) U.S. Cl.
  CPC ........................ *G02B 1/043* (2013.01)
  USPC ......................................... 523/107

(58) Field of Classification Search
  None
  See application file for complete search history.

(56) References Cited

U.S. PATENT DOCUMENTS

| | | | |
|---|---|---|---|
| 3,665,060 A * | 5/1972 | Bergomi et al. ............... 525/201 |
| 3,755,219 A * | 8/1973 | Bergomi et al. ................ 524/26 |
| 4,243,564 A * | 1/1981 | Mavis ......................... 525/54.26 |
| 4,259,467 A | 3/1981 | Keogh et al. |
| 4,260,725 A | 4/1981 | Keogh et al. |
| 4,361,669 A * | 11/1982 | Evans et al. ................... 524/424 |
| 4,605,712 A | 8/1986 | Mueller et al. |
| 4,834,750 A | 5/1989 | Gupta |
| 4,906,718 A | 3/1990 | Gornowicz et al. |
| 5,260,000 A * | 11/1993 | Nandu et al. ................... 264/2.1 |
| 5,290,892 A | 3/1994 | Namdaran et al. |
| 5,331,073 A | 7/1994 | Weinschenk, III et al. |
| 5,403,901 A | 4/1995 | Namdaran et al. |
| 5,433,746 A | 7/1995 | Namdaran et al. |
| 5,470,932 A | 11/1995 | Jinkerson |
| 5,603,774 A | 2/1997 | LeBoeuf et al. |
| 5,674,960 A | 10/1997 | Namdaran et al. |
| 5,693,095 A | 12/1997 | Freeman et al. |
| 5,728,156 A * | 3/1998 | Gupta et al. .................. 623/6.26 |
| 5,861,031 A | 1/1999 | Namdaran et al. |
| 6,653,422 B2 | 11/2003 | Freeman et al. |
| 6,713,583 B2 | 3/2004 | Liao et al. |
| 6,783,897 B2 | 8/2004 | Kang et al. |
| 6,867,245 B2 | 3/2005 | Iwata et al. |
| 6,933,078 B2 | 8/2005 | Huang et al. |
| 7,585,900 B2 | 9/2009 | Cordova et al. |
| 7,714,039 B2 | 5/2010 | Cordova et al. |
| 7,763,682 B2 | 7/2010 | Lowery et al. |
| 7,799,845 B2 | 9/2010 | Schlueter |
| 7,829,611 B2 * | 11/2010 | Kelly ............... 524/17 |
| 7,888,403 B2 | 2/2011 | Schlueter |
| 8,048,154 B2 | 11/2011 | Schlueter |
| 8,058,323 B2 | 11/2011 | Cordova et al. |
| 8,105,378 B2 | 1/2012 | Laredo |
| 8,680,224 B2 * | 3/2014 | Zhang et al. ................... 527/200 |
| 2005/0143751 A1 | 6/2005 | Makker et al. |
| 2006/0063852 A1 | 3/2006 | Iwata et al. |
| 2008/0021187 A1 * | 1/2008 | Wescott et al. ............... 527/301 |
| 2008/0021548 A1 | 1/2008 | Cordova et al. |
| 2008/0051539 A1 * | 2/2008 | Kelly ............................ 526/199 |
| 2009/0088493 A1 | 4/2009 | Laredo et al. |
| 2009/0088544 A1 | 4/2009 | Laredo |
| 2009/0093604 A1 | 4/2009 | Schlueter |
| 2009/0169867 A1 * | 7/2009 | Kelly ............................ 428/326 |
| 2009/0234089 A1 | 9/2009 | Ueyama et al. |
| 2009/0258042 A1 * | 10/2009 | Anastasiou et al. .......... 424/401 |
| 2009/0299022 A1 | 12/2009 | Ichinohe |
| 2010/0069522 A1 | 3/2010 | Linhardt et al. |
| 2010/0093963 A1 | 4/2010 | Ichinohe |
| 2011/0003910 A1 | 1/2011 | Laredo |
| 2011/0178202 A1 | 7/2011 | Laredo |
| 2011/0257291 A1 | 10/2011 | Schlueter |
| 2011/0313518 A1 | 12/2011 | Laredo et al. |
| 2011/0319992 A1 | 12/2011 | Schlueter |
| 2012/0058701 A1 * | 3/2012 | Zhang et al. ................... 442/401 |

FOREIGN PATENT DOCUMENTS

| | | |
|---|---|---|
| EP | 1870736 A1 | 12/2007 |
| JP | 06032855 | 2/1994 |
| JP | 199432855 A1 * | 2/1994 |

OTHER PUBLICATIONS

International Search Report and Written Opinion dated Apr. 24, 2012 for Patent Cooperation Treaty Application No. PCT/US2012/024125.

* cited by examiner

*Primary Examiner* — James J Seidleck
*Assistant Examiner* — Peter A Salamon
(74) *Attorney, Agent, or Firm* — Patrick Ryan

(57) ABSTRACT

Disclosed are low-tack, hydrophobic, high refractive index, acrylic materials. These materials, especially useful as intraocular lens materials, contain one or more aryl acrylic hydrophobic monomers as principal device-forming monomers, a tack-reducing block copolymer additive and a glistening-reducing additive. In addition to their use as intraocular lens materials, the present materials are also suitable for use in other implantable ophthalmic devices.

15 Claims, No Drawings

LOW-TACK, HYDROPHOBIC OPHTHALMIC DEVICE MATERIALS

CROSS-REFERENCE TO RELATED APPLICATIONS

This application claims priority under 35 U.S.C. §119 to U.S. Provisional Patent Application No. 61/440,633, filed Feb. 8, 2011, and Provisional Patent Application No. 61/493,654, filed Jun. 6, 2011, the entire contents of which are incorporated herein by reference.

FIELD OF THE INVENTION

This invention is directed to acrylic device materials. In particular, this invention relates to low-tack, high refractive index acrylic device materials particularly suited for use as intraocular lens ("IOL") materials.

BACKGROUND OF THE INVENTION

With the recent advances in small-incision cataract surgery, increased emphasis has been placed on developing soft, foldable materials suitable for use in artificial lenses. In general, these materials fall into one of three categories: hydrogels, silicones, and acrylics.

In general, hydrogel materials have a relatively low refractive index, making them less desirable than other materials because of the thicker lens optic necessary to achieve a given refractive power. Silicone materials generally have a higher refractive index than hydrogels, but tend to unfold explosively after being placed in the eye in a folded position. Explosive unfolding can potentially damage the corneal endothelium and/or rupture the natural lens capsule. Acrylic materials are desirable because they typically have a higher refractive index than silicone materials and unfold more slowly or controllably than silicone materials.

U.S. Pat. No. 5,290,892 discloses high refractive index, acrylic materials suitable for use as an IOL material. These acrylic materials contain, as principal components, two aryl acrylic monomers. They also contain a cross-linking component. The IOLs made of these acrylic materials can be rolled or folded for insertion through small incisions.

U.S. Pat. No. 5,331,073 also discloses soft acrylic IOL materials. These materials contain as principal components, two acrylic monomers which are defined by the properties of their respective homopolymers. The first monomer is defined as one in which its homopolymer has a refractive index of at least about 1.50. The second monomer is defined as one in which its homopolymer has a glass transition temperature less than about 22° C. These IOL materials also contain a cross-linking component. Additionally, these materials may optionally contain a fourth constituent, different from the first three constituents, which is derived from a hydrophilic monomer. These materials preferably have a total of less than about 15% by weight of a hydrophilic component.

U.S. Pat. No. 5,693,095 discloses foldable ophthalmic lens materials comprising a total of at least 90% by weight of only two principal lens-forming monomers. One lens-forming monomer is an aryl acrylic hydrophobic monomer. The other lens-forming monomer is a hydrophilic monomer. The lens materials also comprise a cross-linking monomer and optionally comprise a UV absorber, polymerization initiators, reactive UV absorbers and reactive blue-light absorbers.

U.S. Pat. No. 6,653,422 discloses foldable ophthalmic lens materials consisting essentially of a single device-forming monomer and at least one cross-linking monomer. The materials optionally contain a reactive UV absorber and optionally contain a reactive blue-light absorber. The single device-forming monomer is present in an amount of at least about 80% by weight. The device-forming monomer is an aryl acrylic hydrophobic monomer.

Some foldable acrylic materials are tacky. Foldable ophthalmic lenses made of tacky acrylic materials are difficult to handle. Attempts have been made to reduce tackiness so that the lenses are easier to process or handle, easier to fold or deform, and have shorter unfolding times. For example, U.S. Pat. No. 6,713,583 discloses ophthalmic lenses made of a material that includes branched chain alkyl groups in an amount effective to reduce tackiness. U.S. Pat. No. 4,834,750 discloses intraocular lenses made from materials that optionally include a fluoroacrylate component to reduce surface tackiness. U.S. Pat. No. 5,331,073 discloses acrylic materials that optionally include a hydrophilic component that is present in an amount sufficient to reduce the materials' tackiness. U.S. Pat. No. 5,603,774 discloses a plasma treatment process for reducing the tackiness of a soft acrylic article.

SUMMARY OF THE INVENTION

Improved soft, foldable acrylic materials which are particularly suited for use as IOLs, but which are also useful as other implantable ophthalmic devices, such as keratoprostheses, corneal rings, corneal implants, and corneal inlays have now been discovered. These materials contain at least one principal lens-forming component, which is an aryl acrylic hydrophobic monomer, in an amount of at least 50% by weight. The materials also contain a poly(ethylene glycol)-polydimethylsiloxane-poly(ethylene glycol)-diacrylate (PPPD) block copolymer containing bondable end groups in order to reduce surface tack. Importantly, in order to reduce or eliminate haze and produce a clear, optically acceptable material, the copolymeric materials of the present invention contain a siloxane monomer, such as 3-[tris(trimethylsilyloxy)silyl]-propyl methacrylate, and a hydrophilic additive to reduce glistenings. The remainder of the material comprises a cross-linking monomer, a UV-light absorbing compound, and optionally a blue-light absorbing compound. The resulting copolymeric device materials are hydrophobic, which as used herein means that they have an equilibrium water content at 35° C. of less than 4%, preferably less than 3%, and more preferably less than 2.5%.

It can be challenging to design an optically clear formulation containing the silicone compound PPPD due to its inherent incompatibility with high refractive index acrylic monomers. For IOLs, it is not enough that they have low tack as they need to be optically clear as well. The implantable ophthalmic device materials of the present invention are optically clear such that they are suitable for use as IOLs and they have low tack, low surface scatter, and good delivery properties. Among other factors, the present invention is based on the finding that a multi-component, copolymeric, high refractive index device material obtained by copolymerizing the ingredients mentioned above is soft, glistening-free, has low tack and low haze, has low surface light scatter, and is capable of going through small (2.5 mm or less) incisions with good unfolding properties.

DETAILED DESCRIPTION OF THE INVENTION

Unless indicated otherwise, all component amounts are presented on a % (w/w) basis ("wt. %").

The ophthalmic device materials of the present invention comprise at least one principal device-forming monomer. For convenience, the device-forming monomer may be referred to as a lens-forming monomer, particularly with reference to an IOL. The materials of the present invention, however, are also suitable for use as other implantable ophthalmic devices such as such as keratoprostheses, corneal rings, corneal implants, and corneal inlays.

The aryl acrylic hydrophobic monomers suitable for use as principal lens-forming monomers in the materials of the present invention have the formula

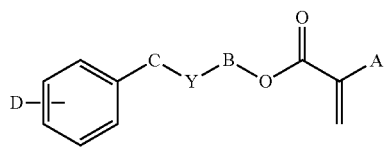

wherein:
A is H;
B is $(CH_2)_m$, $S(CH_2)_u$, $O(CH_2)_v$, or $[O(CH_2)_2]_n$;
u is 1-4;
v is 1-4;
C is $(CH_2)_w$;
m is 1-6;
n is 1-10;
Y is nothing, O, S, or NR, provided that if Y is O, S, or NR, then B is $(CH_2)_m$;
R is H, $CH_3$, $C_nH_{2n+1}$ (n=1-10), iso-$OC_3H_7$, $C_6H_5$, or $CH_2C_6H_5$;
w is 0-6, provided that m+w≤8; and
D is H, $C_1$-$C_4$ alkyl, $C_1$-$C_4$ alkoxy, $C_6H_5$, $CH_2C_6H_5$, Br, F, Cl, or I.

Preferred aryl acrylic hydrophobic monomers for use in the materials of the present invention are those wherein B is $(CH_2)_m$, m is 1-5, Y is nothing, O, or S, w is 0-1, and D is H. Most preferred are benzyl acrylate, 2-phenylethyl acrylate, 2-phenoxyethyl acrylate, 4-phenylbutyl acrylate, 5-phenylpentyl acrylate, 2-benzyloxyethyl acrylate, 3-benzyloxypropyl acrylate, 3-phenylpropyl acrylate, 3-phenoxypropyl acrylate, 2-(phenylthio)propyl acrylate, and 2-(phenylthio)ethyl acrylate. In one embodiment, the materials of the present invention comprise only one principal lens-forming monomer. In another embodiment, the materials of the present invention comprise two principal lens-forming monomers. Particularly preferred lens-forming monomers are 2-phenylethyl acrylate; 2-phenoxyethyl acrylate; benzyl acrylate; and 2-(phenylthio)ethyl acrylate.

Monomers of structure I can be made by known methods. For example, the conjugate alcohol of the desired monomer can be combined in a reaction vessel with methyl acrylate, tetrabutyl titanate (catalyst), and a polymerization inhibitor such as 4-benzyloxy phenol. The vessel can then be heated to facilitate the reaction and distill off the reaction by-products to drive the reaction to completion. Alternative synthesis schemes involve adding acrylic acid to the conjugate alcohol and catalyzing with a carbodiimide or mixing the conjugate alcohol with acryloyl chloride and a HCl acceptor such as pyridine or triethylamine.

The materials of the present invention comprise a total of at least 50%, preferably at least 60%, and more preferably at least 70% of the principal lens-forming monomer(s).

In addition to the principal lens-forming monomer(s), the materials of the present invention contain a PPPD block copolymer additive in an amount sufficient to reduce the material's tackiness. Generally, the amount of PPPD block copolymer in the materials of the present invention will range from 0.3-10%, and preferably will range from 0.5-5%. Most preferably, the amount of PPPD block copolymer in the materials of the present invention will range from 0.8-2.5%. The PPPD block copolymer is an acryloxy-terminated poly(ethylene glycol)-polydimethylsiloxane-poly(ethylene glycol) ABA block copolymer of formula 1:

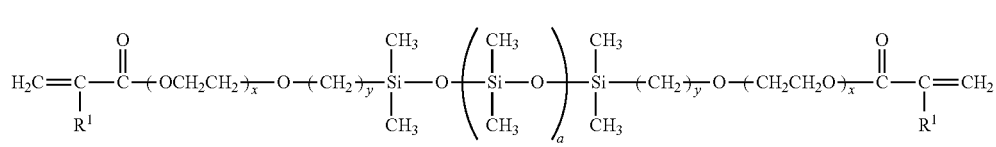

wherein
$R^1$ is H or $CH_3$;
x is 1-20;
y is 3-8; and
a is 1-25.

Preferably, the PPPD block copolymers of formula 1 are those wherein
x is 2-15;
y is 3, and
a is 2-20.

Most preferably, the PPPD block copolymers of formula 1 are those
wherein
x is 5-10,
y is 3, and
a is 5-15.

Acryloxy-terminated ethyleneoxide-dimethylsiloxane-ethyleneoxide ABA block copolymers of formula 1 can be made by known methods and in some cases are commercially available. In one embodiment, the PPPD block copolymer has a MW between 1500-1600, a PEG weight % of approximately 45-55 weight %, viscosity of 80-120 Cst, and a PDMS block MW of 700-800. In another embodiment, the PPPD block copolymer has a MW between 1700-1800, viscosity of 110-150 Cst, a PEG weight % of approximately 30-35 weight %, and a PDMS block MW of 1,000-2,000.

In order to make the PPPD block copolymer of formula 1 and other components compatible in the final composition, the materials of the present invention contain a siloxane monomer of formula 2:

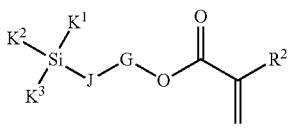

(2)

wherein
$R^2$ is H or $CH_3$;
G is nothing, $O(CH_2)_z$, or $OCH_2CH(OH)CH_2$;
z is 1-3;
J is $(CH_2)_z$; and
$K^1$, $K^2$, and $K^3$ independently are $CH_3$, $C_6H_5$, or $OSi(CH_3)_3$.

Monomers of formula 2 may be made by known methods and in some cases are commercially available. Preferred monomers of formula 2 are those wherein $R^2$ is $CH_3$, G is nothing or $OCH_2CH(OH)CH_2$, J is $(CH_2)_3$, and $K^1$, $K^2$, and $K^3$ independently are $CH_3$, $C_6H_5$, or $OSi(CH_3)_3$. Most preferred monomers of formula 2 are those selected from the group consisting of:
3-[tris(trimethylsilyloxy)silyl]-propyl methacrylate ("TRIS");
3-(methacryloxy-2-hydroxypropoxy)propylmethylbis(trimethoxy)silane (SiMA);
methacryloxypropylpentamethyldisiloxane;
3-methacryloxpropylbis(trimethylsiloxy)methylsilane;
methacryloxymethyltris(trimethylsiloxy)silane ("TRIS2");
(methacryloxymethyl)phenyl-dimethylsilane; and
(methacryloxymethyl)bis(trimethylsiloxy)methylsilane.

In one embodiment, an especially preferred monomer of formula 2 is TRIS2. The amount of monomer of formula 2 in the materials of the present invention will range from 5-30%, preferably 5-25%, and most preferably 5-15%.

In order to reduce glistening, the materials of the present invention also contain a hydrophilic monomer selected from the group consisting of: hydroxy($C_2$-$C_4$ alkyl)methacrylates; glycerol methacrylate; N-vinyl pyrrolidone (NVP); and, as described in co-pending U.S. Patent Application No. 61/356,963, high molecular weight, linear polyethylene glycol compounds of formula 3:

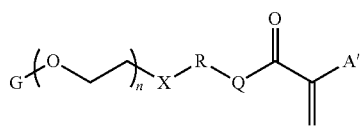

(3)

wherein:
X, X' independently=nothing, O, or NH;
R, R' independently=nothing or $(CH_2)_p$;
p=1-3;
Q, Q' independently=nothing or $C(=O)NHCH_2CH_2O$;
A'=H or $CH_3$;
G=H, $C_1$-$C_4$ alkyl, $(CH_2)_mNH_2$, $(CH_2)_mCO_2H$, or R'—X-Q'—C(=O)C(=$CH_2$)A'; and
n=45-225 when G=H, $C_1$-$C_4$ alkyl, $(CH_2)_mNH_2$, or $(CH_2)_mCO_2H$; otherwise, n=51-225;

and combinations thereof. Hydroxy($C_2$-$C_4$ alkyl)methacrylates, polyethylene glycol compounds of formula 3, and combinations thereof are preferred. The most preferred hydrophilic monomer is 2-hydroxyethyl methacrylate. The materials of the present invention contain a total amount of hydrophilic monomer of 2-20%, preferably 5-15%, and most preferably 8-13%. In one embodiment the materials of the present invention contain at least one hydrophilic monomer selected from the list recited above and at least one hydrophilic monomer of a different type, such as poly(ethylene glycol) monomethyl ether macromer (Mn~4100 Daltons) or the monomers and macromers described in U.S. Published Patent Application Nos. 20090088493, 20090088544, and 20090093604, respectively. Regardless of their identities, the total amount of hydrophilic monomers contained in the materials of the present invention should be limited such that the equilibrium water content (at 35° C.) of the polymerized device material of the present invention is less than 4%.

The copolymer materials of the present invention are cross-linked. The copolymerizable cross-linking agent used in the copolymers of this invention may be any terminally ethylenically unsaturated compound having more than one unsaturated group. Suitable cross-linking agents include, for example low molecular weight cross-linking agents having a molecular weight from 100-500 Daltons and high molecular weight cross-linking agents having a molecular weight from 501-6,000 Daltons. Low molecular cross-linking agents will typically be present in a total amount from 0.5-3%, whereas high molecular weight cross-linking agents will typically be present in a total amount from 2-10%. In general, the total amount of cross-linking agent in the materials of the present invention will range from 0.5-10%, and will preferably range from 1-3%. For purposes of determining the total amount of cross-linker in the present invention, the PPPD block copolymer is not considered to be part of the cross-linking component and is ignored. Suitable low molecular weight cross-linking agents include: ethylene glycol dimethacrylate; diethylene glycol dimethacrylate; allyl methacrylate; 1,3-propanediol dimethacrylate; 2,3-propanediol dimethacrylate; 1,6-hexanediol dimethacrylate; 1,4-butanediol dimethacrylate; triethylene glycol dimethacrylate; and their corresponding acrylates. Preferred low molecular cross-linking monomers include 1,4-butanediol dimethacrylate and triethylene glycol dimethacrylate. Most preferably, the compositions of the present invention contain both 1,4-butanediol diacrylate (BDDA) and triethylene glycol dimethacrylate (TEGDMA). Suitable high molecular weight cross-linking agents include poly(ethylene glycol)diacrylate ($M_n$=700 Daltons) and poly(ethylene glycol)dimethacrylate (PEG $M_n$=1,000 or 2,000 Daltons).

In a preferred embodiment, the materials of the present invention contain 0.5% 1,4-butanediol diacrylate (BDDA) and 1% triethyleneglycol dimethacrylate (TEGDMA).

In addition to the aryl acrylic hydrophobic lens-forming monomer component, the PPPD block copolymer additive, the hydrophilic additive to reduce glistenings, the siloxane component of formula 2, and the cross-linking component, the lens materials of the present invention also contains reactive UV and/or blue-light absorbers.

Many reactive UV absorbers are known. Preferred reactive UV absorbers are 2-(2'-hydroxy-3'-methallyl-5'-methylphenyl)benzotriazole, commercially available as o-Methallyl Tinuvin P ("oMTP") from Polysciences, Inc., Warrington, Pa., and 3-(2H-benzo[d][1,2,3]triazol-2-yl)-4-hydroxyphenylethyl methacrylate ("Norbloc 7966"). UV absorbers are typically present in an amount from about 0.1-5% (w/w). In one embodiment, the materials of the present invention contain 1.5-2.5%, preferably 2%, of a reactive UV absorber.

Many reactive blue-light absorbing compounds are known. Preferred reactive blue-light absorbing compounds are those described in U.S. Pat. No. 5,470,932, U.S. Published Patent Application No. 20110003910, and in co-pending, commonly assigned U.S. patent application Ser. No. 13/008,409, the entire contents of which are hereby incorporated by reference. A preferred blue-light absorbing dye is N-2-[3-(2'-methylphenylazo)-4-hydroxyphenyl]ethyl methacrylamide. Blue-light absorbers are typically present in an amount from about 0.01-0.5% (w/w).

The implantable ophthalmic device materials of the present invention are prepared by combining the ingredients described above and polymerizing the resulting mixture. Suitable polymerization initiators include thermal initiators and photoinitiators. Preferred thermal initiators include perm free-radical initiators, such as 2,2'-(diazene-1,2-diyl)bis(2,4-dimethylpentanenitrile; t-butyl(peroxy-2-ethyl)hexanoate; and di-(tert-butylcyclohexyl) peroxydicarbonate (commercially available as Perkadox® 16 from Akzo Chemicals Inc., Chicago, Ill.). A preferred photoinitiator is phenylphosphorylbis(mesitylmethanone), which is commercially available as Irgacure 819. Initiators are typically present in an amount of about 5% (w/w) or less, and preferably about 1% or less. Customarily, the total amount of initiator is not included when determining the amounts of other ingredients in copolymeric compositions.

The identity and amount of the principal lens-forming monomer component described above and the identity and amount of any additional components are determined by the desired properties of the finished ophthalmic lens. Preferably, the ingredients and their proportion are selected so that the acrylic lens materials of the present invention possess the following properties, which make the materials of the present invention particularly suitable for use in IOLs which are to be inserted through incisions of 2.5 mm or less, and preferably 2.0 mm or less.

The lens material preferably has a refractive index in the dry state of at least about 1.50 as measured by an Abbe' refractometer at 589 nm (Na light source). For a given optic diameter, optics made from materials having a refractive index lower than 1.50 are necessarily thicker than optics of the same power which are made from materials having a higher refractive index. As such, IOL optics made from materials having a refractive index lower than about 1.50 generally require relatively larger incisions for IOL implantation.

The glass-transition temperature ("Tg") of the lens material, which affects the material's folding and unfolding characteristics, is preferably below about 25° C., and more preferably below about 15° C. Tg is measured by differential scanning calorimetry at 10° C./min., and is determined as the half-height of the heat capacity increase.

The lens material will have an elongation (strain at break) of at least 100%, preferably at least 125%, and most preferably at least 150%. This property indicates that the lens generally will not crack, tear or split when folded. Elongation of polymer samples is determined on dumbbell shaped tension test specimens with a 20 mm total length, length in the grip area of 11 mm, overall width of 2.49 mm, 0.833 mm width of the narrow section, a fillet radius of 8.83 mm, and a thickness of 0.9 mm. Testing is performed on samples at standard laboratory conditions of 23±2° C. and 50±5% relative humidity using a tensile tester. The grip distance is set at 11 mm and a crosshead speed is set at 500 mm/minute and the sample is pulled to failure. The strain at break is reported as a fraction of the displacement at failure to the original grip distance. Stress at break is calculated at the maximum load for the sample, typically the load when the sample breaks, assuming that the initial area remains constant. The Young's modulus is calculated from the instantaneous slope of the stress-strain curve in the linear elastic region. The 25% secant modulus is calculated as the slope of a straight line drawn on the stress-strain curve between 0% strain and 25% strain. The 100% secant modulus is calculated as the slope of a straight line drawn on the stress-strain curve between 0% strain and 100% strain.

IOLs constructed of the materials of the present invention can be of any design capable of being rolled or folded into a small cross section that can fit through a relatively smaller incision. For example, the IOLs can be of what is known as a one piece or multipiece design, and comprise optic and haptic components. The optic is that portion which serves as the lens. The haptics are attached to the optic and hold the optic in its proper place in the eye. The optic and haptic(s) can be of the same or different material. A multipiece lens is so called because the optic and the haptic(s) are made separately and then the haptics are attached to the optic. In a single piece lens, the optic and the haptics are formed out of one piece of material. Depending on the material, the haptics are then cut, or lathed, out of the material to produce the IOL.

The invention will be further illustrated by the following examples, which are intended to be illustrative, but not limiting.

Example 1

Preferred Intraocular Lens Material

Preferred intraocular lens materials are presented in Table 1 below. All amounts are expressed as % by weight. These formulations can be initiated using a thermal initiator such as 2,2'-(diazene-1,2-diyl)bis(2,4-dimethylpentanenitrile) (1.0%) or photoinitiator such as phenylphosphorylbis(mesitylmethanone) (Irgacure 819) (0.25%).

TABLE 1

| Ingredient | Formulation % (w/w) | | |
|---|---|---|---|
| | #1 | #2 | #3 |
| 2-Phenylethyl acrylate (PEA) | 72.5 | 0 | 0 |
| 2-Phenoxyethyl acrylate (POEA) | 0 | 72.5 | 0 |
| 2-(Phenylthio)ethyl acrylate (PTEA) | 0 | 0 | 72.5 |
| Poly(ethylene glycol)-polydimethylsiloxane-poly(ethyleneglycol)-diacrylate[1] | 1.0 | 1.0 | 1.0 |
| 3-[Tris(trimethylsilyloxy)silyl]-propyl methacrylate (TRIS) | 10.0 | 10.0 | 10.0 |
| Macromer (Mn = 4,100 Daltons) derived from poly(ethylene glycol) monomethyl ether methacrylate (Mn = 400-600 Daltons) | 3.0 | 3.0 | 3.0 |
| 2-Hydroxyethyl methacrylate | 10.0 | 10.0 | 10.0 |
| Triethylene glycol dimethacrylate (TEGDMA) | 1.0 | 1.0 | 1.0 |
| 1,4-Butanediol diacrylate (BDDA) | 0.5 | 0.5 | 0.5 |
| UV absorber | 2.0 | 2.0 | 2.0 |

[1]$Mn$ = 1,000-2,000 Daltons. $CH_2CH_2O$ content = 30-55 wt. %

The chemicals are weighed, mixed, and filtered together. The resulting formulation solution is flushed with nitrogen gas, degassed, filtered, and then pipetted into degassed polypropylene molds either in an open atmosphere or glovebox with low oxygen levels. The formulations containing thermal initiators are then transferred to an oven in their assembled molds and cured at 70° C. for 1 hour, followed 2 hours at 110° C. The polymer samples are removed from the molds after cooling. The low tack property of the samples is noticeable at this step of the preparation. The samples are extracted with acetone and vacuum dried. Formulations containing photo initiators are prepared in a similar manner but cured in a nitrogen glove box at 55-60° C. for 1 hour using a 40 W Super Actinic lamp source with spectral output between 400-440 nm.

Example 2

IOL Formulations

PEG-PDMS-PEG-diacrylate (PPPD) block copolymers (1) were formulated as shown in Tables 2-8. Single piece IOLs and test samples measuring 20×10×0.9 mm (length×width×thickness) were made via thermal or photo-curing. Thermally cured samples were cured using a 70° C.→110° C. cure cycle. Samples were first ramp heated from ambient temperature to 70° C. over 15 minutes, soaked at 70° C. for 1 hour, ramp heated from 70° C. to 110° C. over 20 minutes, and then soaked at 110° C. for 2 hours. Photo-cured samples were cured by heating test samples in a nitrogen filled glove box for 10 minutes at 55° C. and then irradiating with a Philips TLK 40W/03 24-inch fluorescent lamp for at least 30 minutes, and preferably 60 minutes. Cured samples were extracted in acetone for 20 hours at ambient temperature, dried slowly at ambient temperature for 20 hours, and then vacuum dried at low pressure (0.1 mm Hg) for a minimum of 20 hours at 70° C. As shown in Tables 2-8, a wide range of aliphatic and aromatic monomers, macromers, and polymers were used in attempts to improve the compatibility of the PPPD to give optically clear lenses.

Test samples were equilibrated in deionized water at 35° C. for a minimum of 40 hours. Weight percent extractables, equilibrium water content (EWC), and refractive index values were subsequently measured as shown in Table 8. Sample clarity was qualitatively assessed on hydrated lenses using a Dolan-Jenner Fiber-Lite Fiber Optic Illuminator (model 190). Hydrated lenses were placed in the light path while rotating the samples in the x, y, and z directions to determine relative haze. As shown in Table 9, samples that contained no PPPD were optically clear, but had relatively high tack so were not pursued. Samples containing PPPD and siloxane monomers were classified as clear and moderately low in tack. Samples that contained PPPD without siloxane monomers were generally low in tack but were hazy. Glistening evaluation was carried out by placing samples in deionized water at 45° C. for 20 hours and then cooling to ambient temperature. Samples were inspected using an optical microscope under bright field conditions using a magnification of 100×. All samples containing at least 2% polyPEGMA were inspected for glistenings. No glistenings could be observed under the conditions described.

TABLE 2

| | Example (% w/w) | | | | | | |
|---|---|---|---|---|---|---|---|
| Component | 2A | 2B | 2C | 2D | 2E | 2F | 2G |
| PPPD1 | 15.0 | | 15.0 | | | | |
| PPPD2 | | 15.0 | | 9.94 | 5.02 | 2.50 | 5.0 |
| PEA | 83.0 | | | 86.0 | 91.5 | 93.4 | 84.0 |
| POEA | | 83.1 | 82.0 | | | | |
| PolyPEGMA | 2.06 | 1.99 | | 2.82 | 2.22 | 2.69 | |
| Tergitol-MA | | | 3.02 | | | | |
| DMA | | | | | | | 9.75 |
| BDDA | | | | | 1.22 | 1.44 | 1.25 |

TABLE 2-continued

| | Example (% w/w) | | | | | | |
|---|---|---|---|---|---|---|---|
| Component | 2A | 2B | 2C | 2D | 2E | 2F | 2G |
| TEGDA | | | | 1.25 | | | |
| Perkadox 16 | 1.75 | 1.77 | 1.77 | 1.77 | 1.77 | 1.76 | 1.80 |

PPPD1 = acrylate terminated PEG-PDMS-PEG ABA block copolymer (MW = 1700-1800, 30-35 wt. polyethylene glycol)
PPPD2 = acrylate terminated PEG-PDMS-PEG ABA block copolymer (MW = 1500-1600, 45-55 wt. polyethylene glycol)
PEA = 2-phenylethyl acrylate
POEA = 2-phenoxyethyl acrylate
PolyPEGMA = methacrylate terminated polymer with GPC $M_n$ = 4,100 derived from PEG(550) monomethyl ether methacrylate
Tergitol-MA = methacrylic ester of Tergitol 15-S-30 (Dow/Union Carbide) (a 1500-1600 MW alkyl terminated polyethylene glycol)
DMA = N,N-dimethylacrylamide
BDDA = 1,4-butanediol diacrylate
TEGDA = triethylene glycol diacrylate
Perkadox 16 = bis(4-tert-butylcyclohexyl) peroxydicarbonate

TABLE 3

| | Example (% w/w) | | | | | | |
|---|---|---|---|---|---|---|---|
| Component | 2H | 2I | 2J | 2K | 2L | 2M | 2N |
| PPPD2 | 4.69 | 2.46 | 2.54 | 2.62 | 2.47 | | 2.50 |
| PEA | 84.2 | 90.0 | 89.9 | 83.9 | 78.4 | 87.0 | 73.6 |
| PEMA | | | | | 15.0 | | 19.9 |
| PolyPEGMA | | 2.12 | 2.08 | 2.09 | 2.63 | 1.52 | 2.53 |
| DMA | 4.92 | | 4.04 | | | | |
| HEMA | 4.93 | 3.97 | | 10.0 | | 4.97 | |
| MAA | | | | | | 4.98 | |
| BDDA | 1.29 | 1.45 | 1.40 | 1.40 | 1.52 | 1.50 | 1.53 |
| Perkadox 16 | 1.76 | 1.76 | 1.80 | 1.78 | 1.77 | 1.78 | 1.76 |

PEMA = 2-phenylethyl methacrylate
HEMA = 2-hydroxyethyl methacrylate
MAA = methacrylic acid

TABLE 4

| | Example (% w/w) | | | | | | |
|---|---|---|---|---|---|---|---|
| Component | 2O | 2P | 2Q | 2R | 2S | 2T | 2U |
| PPPD2 | 2.53 | 2.44 | 2.51 | | 2.52 | 2.99 | 3.04 |
| PEA | 83.9 | 82.2 | 84.9 | 90.0 | 84.0 | 83.9 | 84.0 |
| PolyPEGMA | 2.04 | 1.96 | | 1.59 | | 1.53 | 1.99 |
| DMA | 10.0 | 11.9 | 11.1 | | | | |
| HEMA | | | | 3.95 | 12.0 | 10.0 | 9.52 |
| MAA | | | | 3.01 | | | |
| BDDA | 1.50 | 1.45 | 1.49 | 1.50 | | | |
| TEGDMA | | | | | 1.51 | 1.55 | 1.50 |
| Perkadox 16 | 1.74 | 1.75 | 1.76 | 1.78 | 1.79 | 1.78 | 1.79 |

TEGDMA = triethylene glycol dimethacrylate

TABLE 5

| | Example (% w/w) | | | | | | |
|---|---|---|---|---|---|---|---|
| Component | 2V | 2W | 2X | 2Y | 2Z | 2AA | 2BB |
| PPPD2 | 2.51 | 2.56 | 2.60 | 2.50 | 2.50 | | 2.50 |
| PEA | 84.2 | 74.0 | 63.6 | 71.0 | 68.6 | | |
| BzA | | | 19.8 | 10.0 | 9.93 | 83.5 | 79.0 |
| Styrene | | 10.0 | | | | | |
| SiMA | | | | | | | 3.0 |
| PolyPEGMA | 2.47 | 2.51 | 2.59 | | | 2.50 | |
| HEMA | 7.94 | 8.07 | 8.12 | | | | |
| HEA | | | | 15.1 | 15.0 | 10.0 | 14.0 |
| BDDA | | | | 1.43 | | | |
| TEGDA | | | | | | 1.50 | 1.50 |

TABLE 5-continued

| Component | 2V | 2W | 2X | 2Y | 2Z | 2AA | 2BB |
|---|---|---|---|---|---|---|---|
| BisA-DA | 2.89 | 2.87 | 3.32 | | 3.97 | | |
| Perkadox 16 | | | | | | | |
| Irgacure 819 | 0.31 | 0.34 | 0.34 | 0.32 | 0.34 | 0.32 | 0.34 |

BzA = benzyl acrylate
SiMA = 3-(methacryloxy-2-hydroxypropoxy)propylmethylbis(trimethoxy)silane
HEA = 2-hydroxyethyl acrylate
BisA-DA = Bisphenol A ethoxylate (4 EO/phenol) diacrylate
Irgacure 819 = phenylphosphorylbis(mesitylmethanone)

TABLE 6

| Component | 2CC | 2DD | 2EE | 2FF | 2GG | 2HH | 2II |
|---|---|---|---|---|---|---|---|
| PPPD2 | 2.49 | 2.50 | 2.5 | 2.5 | 2.5 | 2.5 | 2.5 |
| PEA | 65.0 | 73.0 | 83.0 | 78.5 | 81.5 | 84.0 | 84.0 |
| PEMA | 27.9 | 20.0 | | | | | |
| CyMA | | | 10.0 | 5.0 | 2.5 | | |
| PolyPEGMA | 3.02 | 3.0 | 3.0 | 2.5 | 2.0 | 2.0 | |
| HEMA | | | | 10.0 | 10.0 | 10.0 | 10.0 |
| 4-Arm PEG | | | | | | | 2.0 |
| TEGDMA | 1.53 | 1.5 | 1.5 | 1.5 | 1.5 | 1.5 | 1.5 |
| AIBN | | 1.0 | 1.0 | 1.0 | 1.0 | 1.0 | 1.0 |

CyMA = cyclohexyl methacrylate
4-Arm PEG = 4-arm polyethylene glycol tetraacrylate (11,600 Da, 95% acrylate substitution)
AIBN = 2,2'-azobisisobutyronitrile or 2,2'-Azobis(2-methylpropionitrile)

TABLE 7

| Component | 2JJ | 2KK | 2LL | 2MM | 2NN | 2OO | 2PP |
|---|---|---|---|---|---|---|---|
| PPPD2 | 2.49 | 2.52 | 2.5 | 2.5 | 2.5 | 2.5 | 2.52 |
| PEA | 82.3 | 80.7 | 80.6 | 80.6 | 75.3 | 75.3 | 64.2 |
| PolyPEGMA | 2.00 | | | | | 19.0 | 3.01 |
| TRIS | | | | | | | 17.5 |
| PEG-360-MA | | 14.0 | | | 19.0 | | |
| PEG-526-MA | | | 14.0 | 14.0 | | | |
| HEMA | 9.89 | | | | | | 10.1 |
| oMTP | 1.81 | | | | | | |
| WL-7 | | 1.21 | 1.2 | 1.2 | 1.2 | 1.2 | 1.22 |
| TEGDMA | 1.55 | 1.53 | 1.0 | 1.0 | 1.0 | 1.0 | 1.57 |
| TEGDA | | | | 1.0 | 1.0 | | |
| BDDA | | | 0.7 | 0.7 | | | |
| AIBN | 1.04 | 1.05 | 1.0 | | | 1.0 | 1.04 |
| Irgacure 819 | | | | 0.3 | 0.3 | | |

TRIS = 3-[tris(trimethylsilyloxy)silyl]propyl methacrylate
PEG-360-MA = poly(ethylene glycol) methacrylate (average MW = 360 Da)
PEG-526-MA = poly(ethylene glycol) methacrylate (average MW = 526 Da)
oMTP = 2-(2H-benzo[d][1,2,3]-triazol-2-yl)-4-methyl-6-(2-methylallyl)phenol
WL-7 = 2-hydroxy-5-methyl-3-(5-(trifluoromethyl)-2H-benzo[d][1,2,3]-triazol-2-yl)benzyl methacrylate

TABLE 8

| Component | 2QQ | 2RR | 2SS | 2TT | 2UU | 2VV | 2WW |
|---|---|---|---|---|---|---|---|
| PPPD2 | 2.65 | 2.49 | 2.54 | 1.11 | 1.02 | | |
| PEA | 64.1 | 63.4 | 63.4 | 72.4 | 72.2 | 60.9 | 61.0 |
| PolyPEGMA | 2.97 | 3.00 | 3.02 | 3.01 | 3.10 | 3.09 | 3.00 |
| TRIS | | | 17.5 | | 9.99 | | 22.5 |
| SiMA | 17.6 | | 17.6 | | 10.0 | | 22.5 |
| HEMA | 9.94 | 9.98 | 9.96 | 9.99 | 10.0 | 10.1 | 9.99 |
| Norbloc 7966 | | 2.01 | 2.00 | 2.01 | 2.01 | 2.01 | 2.00 |
| WL-7 | 1.21 | | | | | | |
| TEGDMA | 1.58 | 1.06 | 1.04 | 1.02 | 1.15 | | |
| HDMA | | | | | | 1.50 | 1.50 |
| BDDA | | 0.51 | 0.51 | 0.51 | 0.50 | | |
| AIBN | 1.06 | | | | | 0.99 | 1.07 |
| Irgacure 819 | | 0.23 | 0.23 | 0.21 | 0.23 | | |

Norbloc 7966 = 3-(2H-benzo[d][1,2,3]triazol-2-yl)-4-hydroxyphenethyl methacrylate
HDMA = 1,6-hexanediol dimethacrylate

TABLE 9

| Example | % Extractables (N ≥ 6) | EWC (35° C.) (wt. %) | Refractive Index (35° C.) | Clarity |
|---|---|---|---|---|
| 2A | 2.1 ± 0.1 | 1.0 | 1.5100 | [1]Hazy |
| 2B | 4.9 ± 0.3 | 1.4 | 1.5290 | [1]Hazy |
| 2C | 5.1 ± 0.2 | 1.4 | 1.5298 | [1]Hazy |
| 2D | 2.0 ± 0.1 | 1.2 | 1.5302 | [1]Hazy |
| 2E | 1.5 ± 0.1 | 0.8 | 1.5400 | [1]Hazy |
| 2F | 1.9 ± 0.3 | 0.9 | 1.5422 | [1]Hazy |
| 2G | 1.5 ± 0.1 | 1.3 | 1.5413 | [1]Hazy |
| 2H | 1.5 ± 0.1 | 1.1 | 1.5410 | [1]Hazy |
| 2I | 1.5 ± 0.1 | 0.8 | 1.5437 | [1]Hazy |
| 2J | 1.5 ± 0.1 | 0.9 | 1.5442 | [1]Hazy |
| 2K | 1.3 ± 0.5 | 1.4 | 1.5385 | [1]Hazy |
| 2L | 1.6 ± 0.1 | 0.8 | 1.5469 | [1]Hazy |
| 2M | 1.7 ± 0.1 | 1.6 | 1.5470 | [2]Clear |
| 2N | 1.4 ± 0.1 | 0.7 | 1.5435 | [1]Hazy |
| 2O | 1.4 ± 0.1 | 1.2 | 1.5384 | [1]Hazy |
| 2P | 1.2 ± 0.1 | 1.1 | 1.5381 | [1]Hazy |
| 2Q | 1.4 ± 0.1 | 1.3 | 1.5440 | [1]Hazy |
| 2R | 1.6 ± 0.1 | 1.2 | 1.5446 | [2]Clear |
| 2S | 2.7 ± 0.3 | 1.3 | 1.5414 | [1]Hazy |
| 2T | 3.7 ± 0.4 | 1.3 | 1.5384 | [1]Hazy |
| 2U | 2.5 ± 0.1 | 1.5 | 1.5384 | [1]Hazy |
| 2V | 1.5 ± 0.1 | 1.5 | 1.5419 | [1]Hazy |
| 2W | 2.1 ± 0.1 | — | — | [1]Hazy |
| 2X | 1.7 ± 0.1 | 1.8 | 1.5412 | [1]Hazy |
| 2Y | 1.1 ± 0.1 | 1.8 | 1.5398 | [1]Hazy |
| 2Z | 1.3 ± 0.1 | — | — | [1]Hazy |
| 2AA | 1.7 ± 0.1 | 1.8 | 1.5470 | [1]Hazy |
| 2BB | 1.1 ± 0.1 | 1.1 | 1.5442 | [3]Clear |
| 2CC | 3.2 ± 0.2 | — | — | [1]Hazy |
| 2DD | 3.1 ± 0.3 | — | — | [1]Hazy |
| 2EE | 3.7 ± 0.2 | — | — | [1]Hazy |
| 2FF | 3.7 ± 0.1 | 1.8 | 1.5306 | [1]Hazy |
| 2GG | 3.0 ± 0.1 | — | — | [1]Hazy |
| 2HH | 3.0 ± 0.2 | — | — | [1]Hazy |
| 2II | 2.7 ± 0.2 | — | — | [1]Hazy |
| 2JJ | 3.9 ± 0.3 | — | — | [1]Hazy |
| 2KK | 3.7 ± 0.1 | 1.8 | 1.5312 | [1]Hazy |
| 2LL | 3.8 ± 0.1 | — | — | [1]Hazy |
| 2MM | 3.1 ± 0.1 | — | — | [1]Hazy |
| 2NN | 3.6 ± 0.1 | — | — | [1]Hazy |
| 2OO | 2.5 ± 0.1 | — | — | [1]Hazy |
| 2PP | 3.3 ± 0.1 | — | — | [3]Clear |
| 2QQ | 3.5 ± 0.1 | — | — | [3]Clear |
| 2RR | 1.0 ± 0.1 | 1.9 | 1.5093 | [3]Clear |
| 2SS | 1.3 ± 0.1 | 2.0 | 1.5060 | [3]Clear |
| 2TT | 1.5 ± 0.1 | 2.0 | 1.5239 | [3]Clear |
| 2UU | 1.7 ± 0.1 | 2.2 | 1.5258 | [3]Clear |
| 2VV | 4.6 ± 0.1 | — | — | [3]Clear |
| 2WW | 5.7 ± 0.3 | — | — | [3]Clear |

[1]Contains PEG-PDMS-PEG-diacrylate (PPPD)
[2]Contains no PPPD
[3]Contains PPPD + siloxane monomer

Example 3

Tack Study

Select test samples from Example 2 were tested for tack using a modified tensilometry test method which measures polymer to metal (stainless steel) tack. Tack values greater than 52 N were considered to have high tack and could not be accurately measured using the chosen load cell. Tack values between 40-52 N were considered to have moderate to high tack. Tack values between 30-40 N were considered to have acceptable tack. Tack values between 20-30 N were considered to have low tack.

Tack Testing Procedure

Tack testing was conducted on an Instron mechanical tester using a custom fixture for measuring the metal-polymer tack or adhesion. The fixture includes a highly polished stainless steel circular stationary pin of 8 mm in diameter that is affixed to the stationary portion of the load frame. The upper (moveable) section of the load frame crosshead is attached to a circular metal platform with a hole in the center. The moveable crosshead is lowered until the bottom pin appears through the hole in the center of the upper fixture and the crosshead movement is stopped when the pin is slightly above the metal platform. The polymer sample is then placed on the protruding pin. A fresh 10 mm diameter disk is press cut from the polymer sample and is placed on the top of the protruding pin. A 300 gram weight is placed on top of the sample, pressing the sample to the pin with a uniform load. One minute after placing the weight on the sample, the Instron mechanical tester is started with a separation rate of 5 mm/min. Data is collected at a rate of 5 points/sec until the sample is pulled up off of the pin. The maximum force and area under the curve (work energy) is recorded.

Results

Six samples of each material were tested for pre-extraction tack and the results averaged. The values are given in Table 10 along with ±1 standard deviation bars. The pre-extraction tack values shown in Table 9 are generally less reliable than post-extraction tack values because of plasticization effects of non-reacted starting material, which is different for each formulation. Thus, the tack results shown in Table 9 represent the highest tack values that can be expected for a given formulation.

TABLE 10

| Example | Max Load (N) |
| --- | --- |
| [1]2F | 33 ± 4 |
| [1]2K | 32 ± 3 |
| [1]2FF | 31 ± 2 |
| [1]2GG | 27 ± 1 |
| [1]2HH | 26 ± 1 |
| [2]2PP | 40 ± 1 |
| [2]2QQ | 30 ± 3 |
| [2]2RR | 40 ± 2 |
| [2]2SS | 29 ± 3 |
| [2]2TT | 31 ± 2 |
| [2]2UU | 33 ± 3 |
| [3]2VV | >52 |
| [3]2WW | >52 |

[1]Contains PPPD, hazy
[2]Contains PPPD + siloxane monomer, clear
[3]Contains no PPPD

Example 4

Tensile Testing

The tensile properties of extracted test samples 2K-2UU were measured using an Instron tensilometer and results are shown in Table 11.

TABLE 11

| Example (N ≥ 3) | Stress at Break (MPa) | Strain at Break (%) | Young's Modulus (MPa) | 25% Secant Modulus (MPa) | 100% Secant Modulus (MPa) |
| --- | --- | --- | --- | --- | --- |
| 2K | 3.6 ± 0.5 | 137 ± 9 | 9.2 ± 0.4 | 2.86 ± 0.05 | 2.02 ± 0.02 |
| 2M | 8.9 ± 0.5 | 125 ± 5 | 58 ± 6 | 15.1 ± 0.8 | 7.1 ± 0.1 |
| 2R | 5.4 ± 0.5 | 144 ± 7 | 23 ± 1 | 5.5 ± 0.2 | 3.08 ± 0.06 |
| 2X | 2.8 ± 0.7 | 134 ± 13 | 18 ± 1 | 1.69 ± 0.02 | 1.55 ± 0.06 |
| 2Y | 3.5 ± 0.6 | 127 ± 8 | 17.4 ± 0.3 | 1.90 ± 0.03 | 2.00 ± 0.01 |
| 2Z | 3.4 ± 0.4 | 144 ± 5 | 17.2 ± 0.4 | 1.65 ± 0.03 | 1.55 ± 0.04 |
| 2AA | 5.6 ± 0.8 | 155 ± 7 | 23.3 ± 0.5 | 3.25 ± 0.06 | 2.30 ± 0.05 |
| 2BB | 6.9 ± 0.6 | 162 ± 7 | 25.9 ± 0.7 | 3.7 ± 0.1 | 2.52 ± 0.07 |
| 2EE | 2.8 ± 0.3 | 147 ± 3 | 19.4 ± 0.6 | 1.55 ± 0.06 | 1.27 ± 0.09 |
| 2FF | 4.1 ± 0.5 | 163 ± 8 | 21 ± 3 | 2.4 ± 0.1 | 1.68 ± 0.07 |
| 2GG | 3.4 ± 0.5 | 159 ± 13 | 22.6 ± 0.7 | 2.07 ± 0.06 | 1.48 ± 0.06 |
| 2HH | 3.3 ± 0.3 | 162 ± 8 | 19 ± 3 | 1.70 ± 0.03 | 1.20 ± 0.02 |
| 2II | 4.3 ± 0.3 | 180 ± 3 | 19 ± 2 | 1.6 ± 0.1 | 1.30 ± 0.08 |
| 2KK | 1.2 ± 0.1 | 84 ± 4 | 19.0 ± 0.6 | 1.1 ± 0.2 | — |
| 2PP | 2.1 ± 0.2 | 119 ± 5 | 20 ± 1 | 1.46 ± 0.06 | 1.43 ± 0.06 |
| 2QQ | 2.1 ± 0.3 | 120 ± 5 | 18 ± 1 | 1.29 ± 0.05 | 1.4 ± 0.1 |
| 2RR | 2.5 ± 0.1 | 112 ± 4 | 17.7 ± 0.6 | 1.83 ± 0.05 | 2.00 ± 0.07 |
| 2SS | 2.1 ± 0.3 | 105 ± 8 | 16.8 ± 0.7 | 1.65 ± 0.05 | 1.87 ± 0.02 |
| 2TT | 2.2 ± 0.1 | 135 ± 1 | 18.9 ± 0.8 | 1.69 ± 0.06 | 1.28 ± 0.06 |
| 2UU | 2.1 ± 0.1 | 130 ± 2 | 17.8 ± 0.9 | 1.5 ± 0.1 | 1.30 ± 0.07 |

Example 5

Surface Scatter Measurements

Light scattering of IOL surfaces is a well known phenomenon which eye care physicians can detect in implanted eyes with the aid of a slit lamp microscope. Scheimpflug photography is one method commonly used to quantify the amount of scattered light. In brief, IOLs are mounted in a custom-made dark eye model filled with either air (dry state) or DI water (wetted and hydrated conditions) at room temperature. A Nidek EAS-1000 Anterior Segment Analysis System is used to capture cross-sectional scheimpflug images of the IOLs with the following settings: 200 W flash, 10 mm slit length, fixed 0.08 mm slit width, fixed camera angle position at 45° from light beam path. Surface scatter densitometry is measured in CCT (computer compatible tape) units ranging from 0 to 255, with the higher numbers corresponding to increased scatter intensity, and the lower numbers corresponding to decreased scatter intensity. Peak pixel density values are measured for both anterior and posterior surfaces of the IOL along the axis of a pre-set center line, which are then averaged for an overall CCT value per IOL.

Image Capture Steps:

1) Age-accelerated samples are removed from the oven and cooled to room temperature, 2) Samples are air-dried for 2 days under biological hood, or under vacuum overnight, 3) Scheimpflug images are captured in dry state (air only) at room temperature, 4) Scheimpflug images are captured in wetted state (<5 minute exposure to BSS) at room temperature, 5) Samples are incubated in 1.5 microfuge tubes filled with 1.0 mL BSS overnight (24 hrs) at room temperature, 6) Scheimpflug images are captured next day in hydrated state (1 day exposure to BSS) at room temperature.

Densitometry Measurements:

1) Reference point (0,0) is selected for position of densitometry measurements along the pre-set center line at or near (just above) the anterior surface of the IOL, 2) The first peak (1×) density measurement point is selected at the anterior IOL surface, 3) The second peak (2×) density measurement point is selected at the posterior IOL surface, 4) Additional anterior and posterior measurements are collected to the left and right of the original center line within the 3 mm optic zone (N=6 measurements total), 5) Anterior and posterior peak density values (CCT) are averaged for the overall CCT measurement per IOL.

Target CCT values for samples of lenses that have been accelerated aged for 10 years are 30 or less. In this study, 21-diopter, single-piece IOLs were made from formulations 2RR, 2SS, 2TT, and 2UU. The IOLs were first aged under accelerated conditions in saline solution (BSS) at 90° C. The lenses were rinsed in deionized water to remove the salts and then dried. Surface scatter measurements were carried out on samples previously equilibrated in BSS saline solution at ambient temperature for 20 hours. As shown in Table 12, samples aged for 1 and 3 years showed low surface scatter counts, between 0-30 CCT.

TABLE 12

| Example (N = 3) | T = 1 yr (hydrated) | T = 3 yr (hydrated) | T = 10 Yr (hydrated) |
|---|---|---|---|
| 2RR | 18 ± 15 | 25 ± 14 | 83 ± 23 |
| 2SS | 40 ± 16 | — | 108 ± 31 |
| 2TT | 6 ± 3 | 8 ± 4 | 21 ± 7 |
| 2UU | — | 10 ± 3 | 39 ± 14 |

CCT

Example 6

Delivery Evaluation of Lenses

40-Diopter lenses from formulations 2TT and 2UU were delivered through Monarch III D cartridges using H4 handpieces and Viscoat viscoelastic. Lens delivery was carried out at 18° C. and 23° C. Post-delivery evaluations included cartridge tip stress levels as shown in Table 13. In general, stress level values of 4 or 5 typically signify some level of cartridge damage, whereas values between 0-2 signify little to no damage. As shown in Table 13, stress level values were low in all cases and no cartridge damage was observed at either 18 or 23° C. Furthermore, the nozzle stress values were less than those reported for 27.0-diopter Acrysof (SN60WF) lenses using similar cartridges and conditions. Post-delivery evaluations also included delivery force measurements, where values below 15 N are considered acceptable. As shown in Table 14, delivery force values at 18° C. were all well below 15 N. In general, all lenses unfolded quickly, within 2 seconds of delivery at 18 and 23° C. In addition, haptics did not stick to the optic region upon delivery.

TABLE 13

| Formulation (N = 3) | Temp (° C.) | Dwell Time (Min) | Nozzle Stress Level (0-5) |
|---|---|---|---|
| 2TT | 23 | 0 | 2 |
| 2TT | 18 | 0 | 2 |
| 2UU | 23 | 0 | 2 |
| 2UU | 18 | 0 | 1 |

TABLE 14

| Formulation (N = 3) | Temp (° C.) | Maximum Load (N) |
|---|---|---|
| 2TT | 18 | 5.4 ± 0.1 |
| 2UU | 18 | 6.1 ± 0.3 |

Example 7

Surface Light Scattering of Materials Containing Various Siloxanes, Silicone Tack Reducers, Hydrophilic Monomers, and Aromatic Monomers

TABLE 15

| Component | Example % (w/w) | | | | | | |
|---|---|---|---|---|---|---|---|
| | 7A | 7B | 7C | 7D | 7E | 7F | 7G |
| PPP1 | | | | | 1.00 | | |
| PPPD2 | 1.00 | 1.00 | | | | 2.50 | 1.17 | 1.17 |
| MFS-M15 | | | 1.00 | | | | |
| PEA | 72.5 | 72.5 | 72.5 | 72.5 | 81.5 | 77.9 | |
| POEA | | | | | | | 72.7 |
| Poly-PEGMA | 3.00 | 3.00 | 3.00 | 3.00 | 2.50 | 3.04 | 3.00 |
| TRIS | 10.0 | | 10.0 | 10.0 | | 10.0 | 10.0 |
| DMPSM-MA | | 10.0 | | | | | |
| HEMA | | 10.0 | 10.0 | 10.0 | 10.0 | | |
| HEA | 10.0 | | | | | | |
| Norbloc 7966 | | 2.00 | 2.00 | 2.00 | 2.00 | | |
| oMTP | 1.80 | | | | | 1.79 | 1.80 |
| TEGDMA | 1.00 | 1.00 | 1.00 | 1.00 | 1.50 | | 1.00 |
| BDDA | 0.50 | 0.50 | 0.50 | 0.50 | | | 0.50 |
| PPG900-DA | | | | | | 6.10 | |
| Irgacure 819 | 0.25 | 0.25 | 0.20 | 0.20 | 0.20 | 0.25 | 0.25 |
| V-65 | | | | | | | |

TABLE 15-continued

|  | Example % (w/w) | | | | | | |
|---|---|---|---|---|---|---|---|
| Component | 7A | 7B | 7C | 7D | 7E | 7F | 7G |
| Surface Scatter (CCT at T = 10 yr, hydrated) | [1]Hazy | 40 ± 13 | 70 ± 12 | 40 ± 6 | [2]Hazy | 159 ± 34 | 29 ± 8 |

V-65 = 2,2'-Azobis(2.4-dimethyl valeronitrile)
HEA = 2-hydroxyethyl acrylamide
DMPSM-MA = (dimethyl(phenyl)silyl)methyl methacrylate
MFS-M15 = monomethacryloxypropyl terminated polytrifluoropropylmethylsiloxane symmetric, 45-55 cSt
PPG900-DA = poly(propylene glycol)-diacrylate,
$M_n$ = 900
[1]Material phase separated predominantly in haptic region and lens edges
[2]Material showed excessive bulk haze

Example 8

Synthesis of 2-(phenylthio)ethyl acrylate (PTEA)

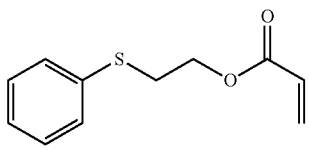

To a 500 mL three-neck round bottom flask equipped with mechanical stirrer were charged 2-hydroxyethyl phenyl sulfide (33.0 g, 0.21 mol), anhydrous triethylamine (45 mL, 0.32 mol), and anhydrous tetrahydrofuran (160 mL). The solution was cooled in a −30° C. acetone/dry ice bath under nitrogen blanket for 15 mins. Acryloyl chloride (22 mL, 0.27 mol) was added into the vigorously stirred cold solution through an addition funnel over 30 min. After the addition, the reaction mixture was stirred in the cold acetone bath for additional four hours followed by quenching with the addition of 2M HCl (200 mL). The mixture was extracted with diether ether (150 mL×3) and the combined organic layer was washed with DI water (200 mL×3), aqueous sodium bicarbonate (200 mL×2), and dried over $MgSO_4$. Filtration and removal of solvents under reduced pressure gave the crude product as a light brown oil which was purified on silica gel using Hexanes/Ethyl acetate (50/1, v/v) as eluent to give the final product as a colorless oil (27.4 g, 0.13 mol, yield: 62%), $H^1$ NMR ($CDCl_3$): δ 7.44 (2H), 7.33 (2H), 7.24 (1H), 6.41 (1H), 6.12 (1H), 5.85 (1H), 4.35 (2H), 3.21 (2H).

Example 9

Lens Materials with Higher Refractive Index

Formulations with higher refractive index values were made using 2-(phenylthio)ethyl acrylate (PTEA) as shown in Table 16. Corresponding mechanical data, equilibrium water content, % extractables, and R.I. values are shown in Table 17.

TABLE 16

|  | Example % (w/w) | | |
|---|---|---|---|
| Component | 2TT | 9A | 9B |
| PPPD2 | 1.11 | 1.01 | 1.00 |
| PEA | 72.4 | 42.69 | 22.74 |
| PTEA |  | 30.00 | 49.97 |
| PolyPEGMA | 3.01 | 3.00 | 3.00 |
| TRIS | 9.99 | 10.00 | 9.98 |
| HEMA | 9.99 | 10.00 | 10.00 |
| Norbloc 7966 | 2.01 |  |  |
| oMTP |  | 1.80 | 1.80 |
| TEGDMA | 1.02 | 1.00 | 1.02 |
| BDDA | 0.51 | 0.50 | 0.49 |
| Irgacure 819 | 0.21 | 0.22 | 0.22 |

PTEA = 2-(phenylthio)ethyl acrylate

TABLE 17

| Example (N ≥ 3) | % Extracts | EWC (35° C.) | R.I. (35° C.) | Strain at Break (%) | Young's Modulus (MPa) |
|---|---|---|---|---|---|
| 2TT | 1.5 ± 0.1 | 2.0 | 1.524 | 135 ± 1 | 18.9 ± 0.8 |
| 9A | 2.4 ± 0.1 | 1.2 | 1.531 | 193 ± 11 | 11.8 ± 1.1 |
| 9B | 2.8 ± 0.2 | 1.4 | 1.537 | 190 ± 8 | 12.2 ± 0.4 |

Example 10

Lens Materials with High Molecular Weight, Linear Polyethylene Glycol Compounds

TABLE 18

|  | Example (% w/w) | | | | | | |
|---|---|---|---|---|---|---|---|
| Component | 10A | 10B | 10C | 10D | 10E | 10F | 10G |
| PPPD2 | 2.5 | 2.4 | 2.5 | 2.5 | 2.1 | 2.5 | 2.0 |
| PEA | 76.4 | 70.4 | 73.0 | 75.6 | 66.8 | 68.6 | 66.1 |
| TRIS |  |  |  |  | 10.0 | 10.0 | 10.0 |
| PEG700DA |  |  |  |  |  |  | 3.9 |
| PEG1000DMA |  | 10.2 | 7.5 | 4.9 |  |  |  |
| PEG2000DMA | 3.0 |  |  |  |  |  | 3.0 |
| PEG4000DA |  |  |  |  | 3.0 | 2.5 |  |
| HEMA | 15.0 | 15.0 | 15.1 | 15.0 | 15.0 | 14.0 | 13.0 |
| BDDA | 1.1 |  |  |  | 1.0 | 0.92 |  |

TABLE 18-continued

| Component | Example (% w/w) | | | | | | |
|---|---|---|---|---|---|---|---|
| | 10A | 10B | 10C | 10D | 10E | 10F | 10G |
| Norbloc 7966 | 2.0 | 2.0 | 2.0 | 2.0 | 2.0 | 2.0 | 2.0 |
| Irgacure 819 | 0.25 | 0.24 | 0.24 | 0.23 | 0.24 | 0.22 | 0.24 |

PEG700DA = poly(ethylene glycol) diacrylate ($M_n$ = 700)
PEG1000DMA = poly(ethylene glycol) dimethacrylate ($M_n$ = 1000)
PEG2000DMA = poly(ethylene glycol) dimethacrylate ($M_n$ = 2000)
PEG4000DA = poly(ethylene glycol) diacrylate ($M_n$ = 4000)
Irgacure 819 = phenylphosphorylbis(mesitylmethanone)

Example 11

Lens Materials with TRIS2

TABLE 19

| Component | Example % (w/w) | | | |
|---|---|---|---|---|
| | 11A | 11B | 11C | 11D |
| PPPD2 | 1.13 | 1.01 | 1.01 | 1.00 |
| PEA | 72.4 | 72.5 | 72.5 | 75.0 |
| PolyPEGMA | 3.14 | 3.02 | 3.02 | 2.50 |
| TRIS2 | 9.94 | 9.97 | 9.97 | 8.66 |
| HEMA | 10.4 | 10.5 | 10.5 | 10.0 |
| oMTP | 1.81 | 1.80 | 1.80 | 1.80 |
| BB | 0.043 | 0.040 | 0.040 | 0.040 |
| EGDMA | 0.57 | | | 0.50 |
| TEGDMA | | 0.71 | 0.71 | |
| BDDA | 0.52 | 0.50 | 0.50 | 0.50 |
| AIBN | | | 1.0 | |
| Irgacure 819 | 0.22 | 0.21 | | 0.20 |

TRIS2 = 3-[tris(trimethylsilyloxy)silyl]methymethacrylate
BB = N-(4-hydroxy-3-(o-tolyldiazenyl)phenethyl)methacrylamide
EGDMA = ethylene glycol dimethacrylate

TABLE 20

| | Stress at Break (MPa) | Strain at Break (%) | Young's Modulus (MPa) | 25% Secant Modulus (MPa) | 100% Secant Modulus (MPa) |
|---|---|---|---|---|---|
| 11A | 3.06 ± 0.08 | 189 ± 1 | 10.9 ± 0.1 | 2.36 ± 0.05 | 1.14 ± 0.02 |

TABLE 21

| Example | Max Load (N) |
|---|---|
| 11A | 31 ± 4 |

TABLE 22

| Example | % Extractables (N ≥ 6) |
|---|---|
| 11A | 3.4 ± 0.1 |
| 11B | 2.9 ± 0.1 |

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A copolymeric ophthalmic device material formed by polymerizing a mixture comprising
   a) 70% (w/w) or more of an aryl acrylic hydrophobic monomer of the formula

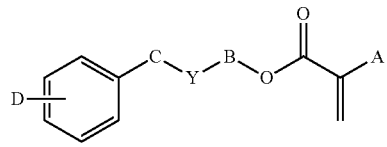

wherein:
A is H;
B is $(CH_2)_m$, $S(CH_2)_u$, $O(CH_2)_v$, or $[O(CH_2)_2]_n$;
u is 1-4;
v is 1-4;
C is $(CH_2)_w$;
m is 1-6;
n is 1-10;
Y is nothing, O, S, or NR, provided that if Y is O, S, or NR, then B is $(CH_2)_m$;
R is H, $CH_3$, $C_nH_{2n+1}$ (n=1-10), iso-$OC_3H_7$, $C_6H_5$, or $CH_2C_6H_5$;
w is 0-6, provided that m+w≤8; and
D is H, $C_1$-$C_4$ alkyl, $C_1$-$C_4$ alkoxy, $C_6H_5$, $CH_2C_6H_5$, Br, F, Cl, or I;
   b) 0.8-2.5% (w/w) of an acryloxy-terminated poly(ethylene glycol)-polydimethylsiloxane-poly(ethylene glycol) ABA block copolymer of formula 1:

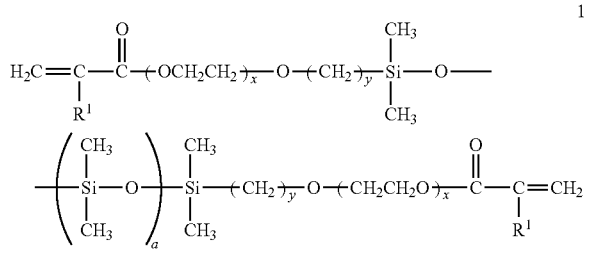

wherein
$R^1$ is H or $CH_3$;
x is 5-10;
y is 3; and
a is 5-15;
   c) 5-30% (w/w) of a siloxane monomer of formula 2:

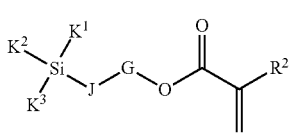

wherein
$R^2$ is H or $CH_3$;
G is nothing, $O(CH_2)_z$, or $OCH_2CH(OH)CH_2$;

z is 1-3;

J is $(CH_2)_z$; and $K^1$, $K^2$, and $K^3$ independently are $CH_3$, $C_6H_5$, or $OSi(CH_3)_3$;

d) 2-20% (w/w) of a hydrophilic monomer selected from the group consisting of: hydroxy($C_2$-$C_4$ alkyl)methacrylates, glycerol methacrylate, and N-vinyl pyrrolidone;

e) a cross-linking monomer; and f) a reactive UV absorber.

2. The copolymeric ophthalmic device material of claim 1 wherein the copolymeric device material has an equilibrium water content at 35° C. of less than 4%.

3. The copolymeric device material of claim 1 wherein the aryl acrylic hydrophobic monomer is selected from the group consisting of: benzyl acrylate; 2-phenylethyl acrylate; 2-phenoxyethyl acrylate; 4-phenylbutyl acrylate; 5-phenylpentyl acrylate; 2-benzyloxyethyl acrylate; 3-benzyloxypropyl acrylate; 3-phenylpropyl acrylate; 3-phenoxypropyl acrylate; 2-(phenylthio)propyl acrylate; and 2-(phenylthio)ethyl acrylate.

4. The copolymeric device material of claim 3 wherein the aryl acrylic hydrophobic monomer is selected from the group consisting of: 2-phenylethyl acrylate; 2-phenoxyethyl acrylate; benzyl acrylate; and 2-(phenylthio)ethyl acrylate.

5. The copolymeric device material of claim 1 wherein for the siloxane monomer of formula 2 $R^2$ is $CH_3$, G is nothing or $OCH_2CH(OH)CH_2$, J is $(CH_2)_3$, and $K^1$, $K^2$, and $K^3$ independently are $CH_3$, $C_6H_5$, or $OSi(CH_3)_3$.

6. The copolymeric device material of claim 5 wherein the siloxane monomer of formula 2 is selected from the group consisting of:

3-[tris(trimethylsilyloxy)silyl]-propyl methacrylate;

3-(methacryloxy-2-hydroxypropoxy)propylmethylbis(trimethoxy)silane;

methacryloxypropylpentamethyldisiloxane;

3-methacryloxypropylbis(trimethylsiloxy)methylsilane;

methacryloxymethyltris(trimethylsiloxy)silane;

(methacryloxymethyl)phenyl-dimethylsilane; and (methacryloxymethyl)bis(trimethylsiloxy)methylsilane.

7. The copolymeric device material of claim 1 wherein the mixture comprises 5-25% (w/w) of the siloxane monomer of formula 2.

8. The copolymeric device material of claim 7 wherein the mixture comprises 5-15% (w/w) of the siloxane monomer of formula 2.

9. The copolymeric device material of claim 1 wherein the hydrophilic monomer is a hydroxy($C_2$-$C_4$ alkyl)methacrylate and the mixture comprises 5-15% (w/w) of the hydrophilic monomer.

10. The copolymeric device material of claim 9 wherein the hydrophilic monomer is 2-hydroxyethyl methacrylate and the mixture comprises 8-13% (w/w) of the hydrophilic monomer.

11. The copolymeric device material of claim 1 wherein the mixture comprises 0.5-10% (w/w) of the cross-linking agent.

12. The copolymeric device material of claim 11 wherein the mixture comprises 1-3% (w/w) of the cross-linking agent and the cross-linking agent is selected from the group consisting of: ethylene glycol dimethacrylate; diethylene glycol dimethacrylate; allyl methacrylate; 1,3-propanediol dimethacrylate; 2,3-propanediol dimethacrylate; 1,6-hexanediol dimethacrylate; 1,4-butanediol dimethacrylate; triethylene glycol dimethacrylate; and their corresponding acrylates.

13. The copolymeric device material of claim 12 wherein the cross-linking agent is selected from the group consisting of 1,4-butanediol dimethacrylate and triethylene glycol dimethacrylate.

14. The copolymeric device material of claim 1 wherein the mixture further comprises a reactive blue-light absorbing compound.

15. An intraocular lens comprising the copolymeric device material of claim 1.

* * * * *